(12) United States Patent
Chi et al.

(10) Patent No.: US 7,859,134 B2
(45) Date of Patent: Dec. 28, 2010

(54) SELF-CONFIGURABLE MULTI-REGULATOR ASIC CORE POWER DELIVERY

(75) Inventors: Steve X. Chi, Cupertino, CA (US); Yongliang Wang, Saratoga, CA (US); Ekram Hossain Bhuiyan, San Jose, CA (US); Daniel P. Nguyen, Campbell, CA (US); Vincent Anthony Condito, San Jose, CA (US); Po-Shen Lai, San Jose, CA (US)

(73) Assignee: SanDisk Corporation, Milpitas, CA (US)

( * ) Notice: Subject to any disclaimer, the term of this patent is extended or adjusted under 35 U.S.C. 154(b) by 423 days.

(21) Appl. No.: 12/005,056

(22) Filed: Dec. 21, 2007

(65) Prior Publication Data

US 2009/0164807 A1    Jun. 25, 2009

(51) Int. Cl.
*H02J 1/00*      (2006.01)
*H02J 3/00*      (2006.01)

(52) U.S. Cl. ........................................... 307/80
(58) Field of Classification Search .................... 307/80, 307/82, 85
See application file for complete search history.

(56) References Cited

U.S. PATENT DOCUMENTS

| | | | |
|---|---|---|---|
| 6,097,241 A | 8/2000 | Bertin et al. | |
| 6,654,263 B2 | 11/2003 | Kurotsu | |
| 6,654,264 B2 | 11/2003 | Rose | |
| 6,710,621 B2 | 3/2004 | Devlin et al. | |
| 6,950,896 B2 | 9/2005 | Scordalakes et al. | |
| 7,058,373 B2 | 6/2006 | Grigore | |
| 2006/0270366 A1 | 11/2006 | Rozenblit et al. | |

(Continued)

FOREIGN PATENT DOCUMENTS

KR    10-2007-0029693    3/2007

(Continued)

OTHER PUBLICATIONS

Balan, V., "A Low-Voltage Regulator Circuit With Self-Bias to Improve Accuracy", *2003 IEEE Solid-State Circuit Journal*, vol. 38, No. 2, pp. 365-368, Feb. 2003.

(Continued)

*Primary Examiner*—Jared J Fureman
*Assistant Examiner*—Carlos Amaya
(74) *Attorney, Agent, or Firm*—Brinks Hofer Gilson & Lione

(57) ABSTRACT

A method for operating an electronic product having an application specific semiconductor circuit (ASIC) including in its circuitry both a linear regulator module for use with an optional external capacitance and a capless regulator module coupled to internal capacitance of the product selects a low-power sub-module or high-power sub-module of the capless regulator module for use in a power-up phase of the ASIC. Control logic of the ASIC determines if an external capacitance is present. If so, then the high-power capless sub-module is used during a power-up phase of the ASIC; if not only the low-power capless sub-module is used during the power-up phase of the ASIC. After power-up of the ASIC, the control logic may select the linear regulator module for certain times of operation and the capless regulator module for other times of operation or it may select one or the other for all times of post-power-up operation.

42 Claims, 8 Drawing Sheets

U.S. PATENT DOCUMENTS

2007/0114981 A1 5/2007 Vasquez et al.
2007/0288772 A1 12/2007 Li

FOREIGN PATENT DOCUMENTS

WO    WO 2006/062505    6/2006

OTHER PUBLICATIONS

International Search Report and Written Opinion for PCT/US2008/085461, dated Jun. 18, 2009, 12 pages.

Patella, B. et al., "High Frequency Digital PWM Controller IC for DC-DC Converters", *2003 IEEE Transactions on Power Electronics,* vol. 18, No. 1, pp. 438-446, Jan. 2003.

U.S. Appl. No. 12/005,126, entitled, "Self-Configurable Multi-Regulator ASIC Core Power Delivery", filed Dec. 21, 2007.

Notice of Allowance and Fee(s) Due dated Jan. 26, 2010, issued in connection with U.S. Appl. No. 12/005,126 (7 pages).

Hazucha, P. et al., "Area-Efficient Linear Regulator With Ultra-Fast Load Regulation", IEEE Journal of Solid —State Circuits, vol. 40, No. 4, pp. 933-940, Apr. 2005.

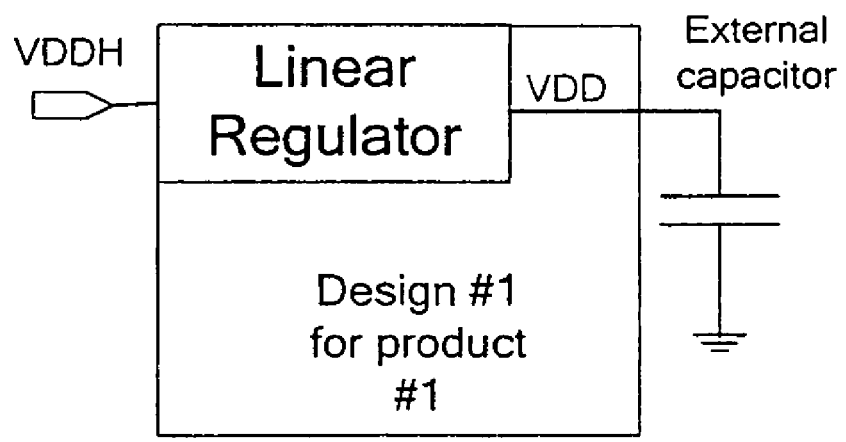
PRIOR ART  FIG. 1
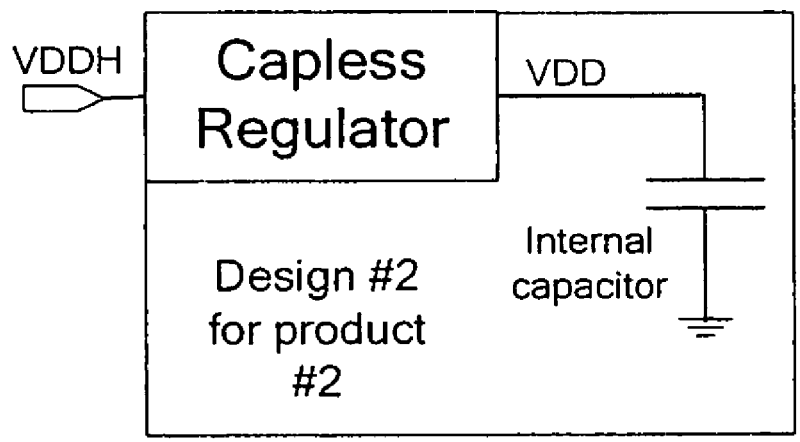
PRIOR ART  FIG. 2

SELF-CONFIGURABLE MULTI-REGULATOR ASIC CORE POWER DELIVERY

STATEMENT OF RELATED APPLICATIONS

The present application may be considered to be related to co-pending U.S. patent application Ser. No. 12/005,126 filed on even date herewith, in the name of inventors Steve X. Chi, Yongliang Wang, Ekram H. Bhuiyan, Daniel P. Nguyen, Vincent A. Condito and Po-Shen Lai, entitled "Self-Configurable Multi-Regulator ASIC Core Power Delivery", commonly owned herewith.

TECHNICAL FIELD

The present disclosure relates generally to an ASIC core or similar electronic circuit that can be powered by various power regulator technologies selected "on the fly" depending upon the actual application in which it is used.

BACKGROUND

An ASIC (Application Specific Integrated Circuit) is a semiconductor device designed for a particular application. ASICs may include virtually any collection of circuits known. For example, they are used in consumer memory devices such as those used with cameras, music players, navigation devices and the like. They are also used in many other types of electronic devices and may be highly specialized to a particular task or set of tasks.

An ASIC core is a defined function to be performed by circuitry which has been designed and verified as a standalone entity and is available in an ASIC function library for a particular process technology. Each ASIC core is an element whose performance and function are understood and which can be, essentially, used as a building block in constructing an ASIC chip design. An ASIC core may be implemented as a function plus a predefined physical layout or standard cell, a function plus a physical layout to be implemented by the ASIC vendor, or as a function embodied in a standard technology-dependent gate-level net list to be fully integrated by the customer.

ASIC cores, when implemented as real circuits, require regulated power in order to operate. Typically they are powered by one of the available various regulator technologies depending upon the needs of the circuit. For example, for applications requiring extremely low quiescent and active operating current but which can tolerate the use of an external (i.e., relatively large) capacitor, a linear (e.g., low dropout (LDO)) regulator is highly suitable. Such an approach is used, for example, in micro secure digital (SD) memory cards and is illustrated in bock diagram form in FIG. 1. On the other and, if board space (or other physical space) is at a premium and higher quiescent and active operating currents are tolerable, then a capless regulator having no external capacitor may be a better solution. This situation is often encountered in high-end memory card applications (e.g., Memory Stick-type Flash memory cards, and the like) and is illustrated in block diagram form in FIG. 2.

The design, validation and construction of ASIC chips represents a significant investment for an electronic product manufacturer. It would be desirable to reduce such costs to the extent possible.

Overview

A method for operating an electronic product having an application specific semiconductor circuit (ASIC) device which includes in its circuitry both a linear regulator module configured to be coupled to an optional external capacitance and a capless regulator module coupled to internal capacitance of the electronic product selects one of a low-power sub-module and a high-power sub-module of the capless regulator module for use in a power-up phase of the ASIC. Control logic of the ASIC device determines if an external capacitance is present. If it is, then the control logic causes the high-power capless regulator sub-module to be used during a power-up phase of the ASIC. Otherwise only the low-power capless regulator sub-module is used during a power-up phase of the ASIC. After power-up of the ASIC, the control logic may select the linear regulator module for certain times of operation and the capless regulator module for other times of operation or it may select one or the other for all times of post-power-up operation.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings:

FIGS. 8-1, 8-2 and 8-3 together constitute a process flow diagram illustrating a method in accordance with one embodiment.

DESCRIPTION OF EXAMPLE EMBODIMENTS

Example embodiments are described herein in the context of an electronic product including an ASIC device. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines, e.g., in a controller of a non-volatile memory device. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, and the like), magnetic storage medium (e.g., tape, magnetic disk drive, and the like), optical storage medium (e.g., CD-ROM, DVD-ROM, paper card, paper tape and the like) and other types of program memory.

Figure 3:
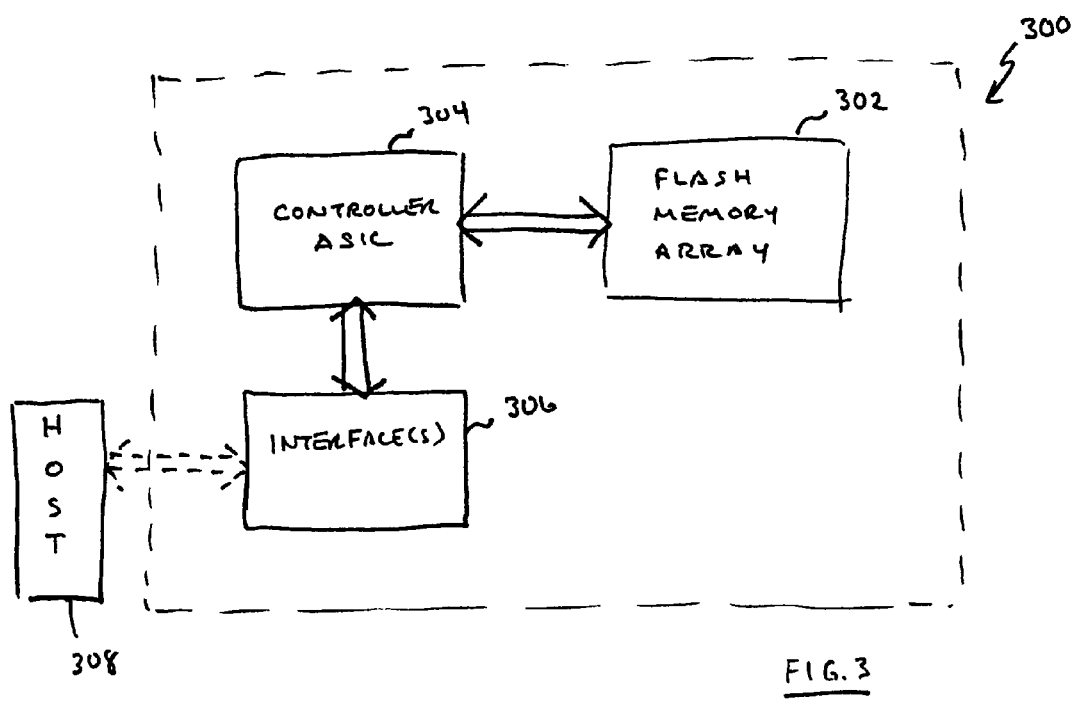
FIG. 3 is a schematic block diagram of an example memory device including a flash memory array, a controller ASIC device and interface(s) to a host device.

In accordance with one example embodiment, the invention may be used in a memory device useable with consumer electronic equipment such as computers, digital cameras, digital music players, navigation equipment, communications equipment, and the like. It may also be employed in other electronic products as will now be apparent to those of ordinary skill in the art. FIG. 3 illustrates a typical system block diagram of such a memory device. In the example memory device 300 of FIG. 3 a flash memory array 302 is controlled by a controller device 304 implemented as an ASIC device. Interface circuitry 306 is coupled to the controller 304 and provides connectivity to conventional host devices 308 to which memory device 300 may be coupled.

Figures 1, 8:
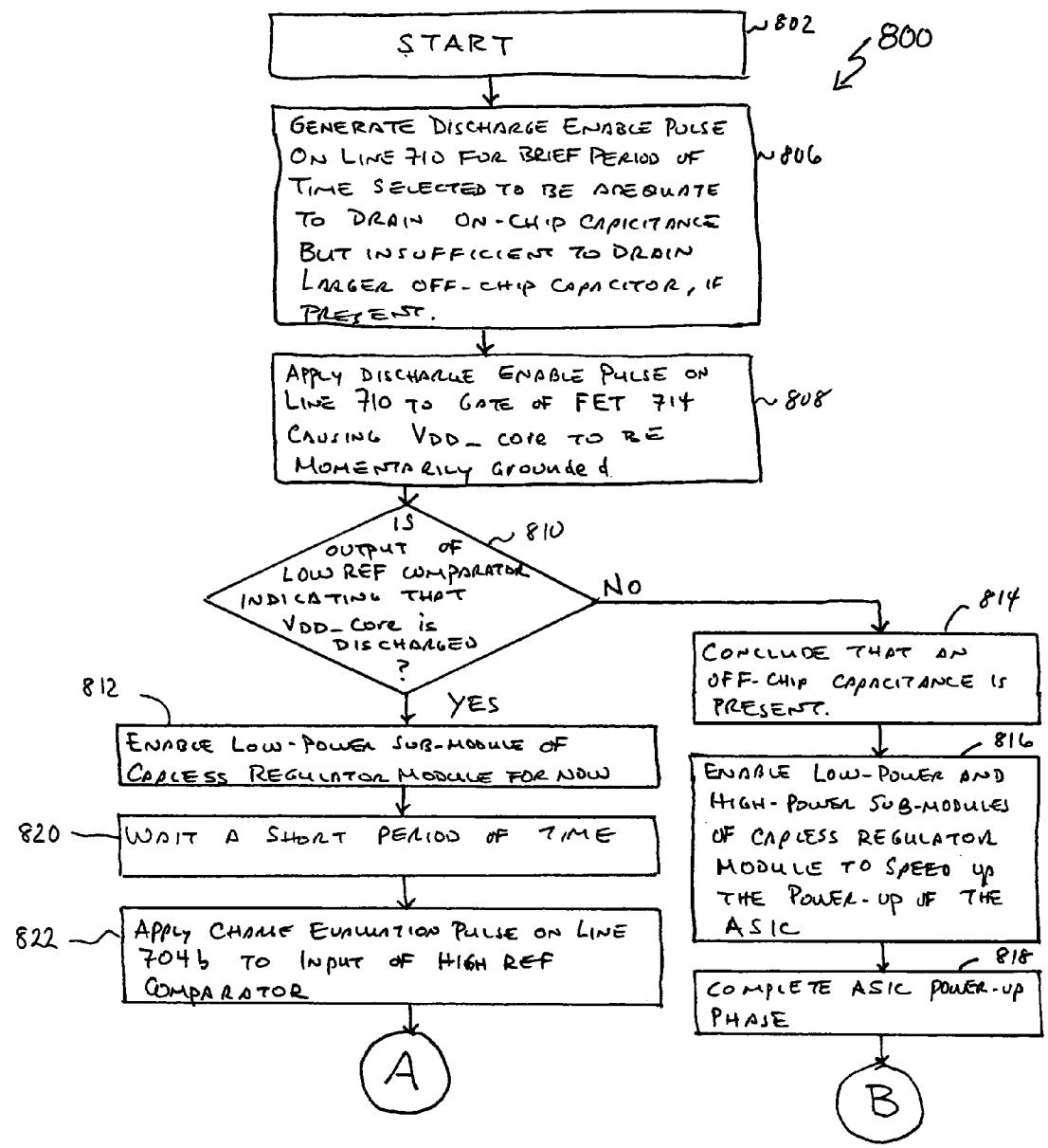
Figures 2, 8:
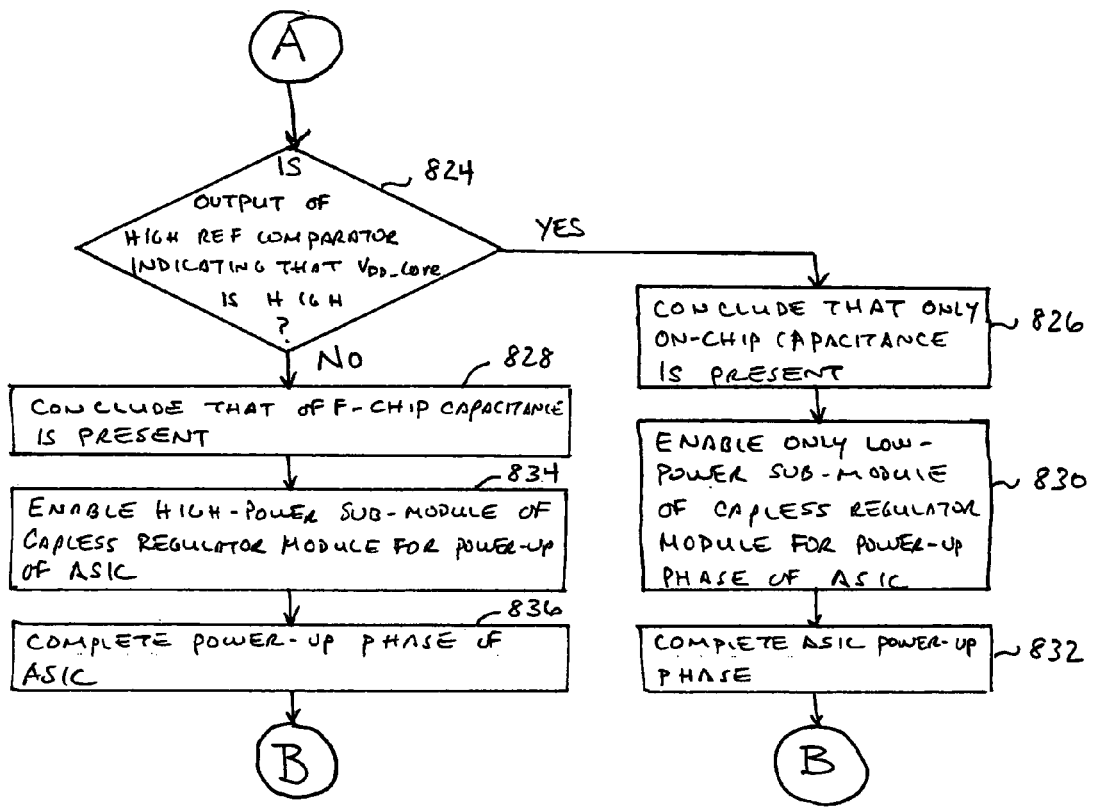
Figures 3, 8:
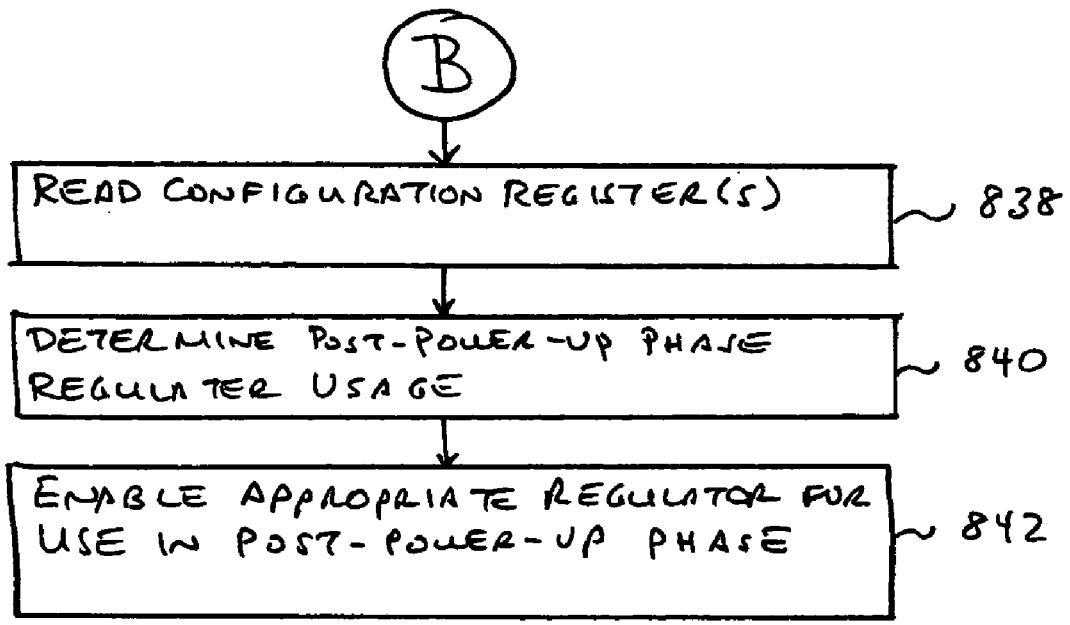
Figure 1:
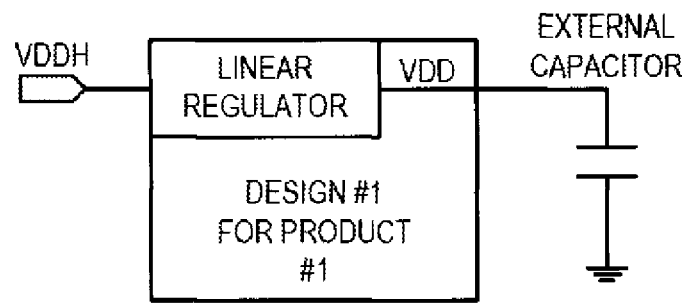
FIG. 1 is a schematic block diagram for a first electronic product powered by a linear voltage regulator employing an external (relatively large) capacitance in accordance with the known art.
Figure 2:
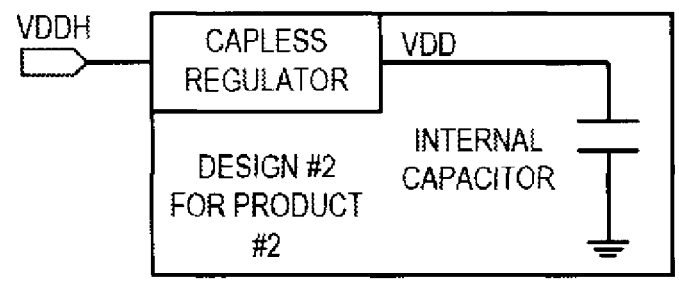
FIG. 2 is a schematic block diagram for a second electronic product powered by a linear voltage regulator employing an internal (relatively small) capacitance in accordance with the known art.
Figure 3:
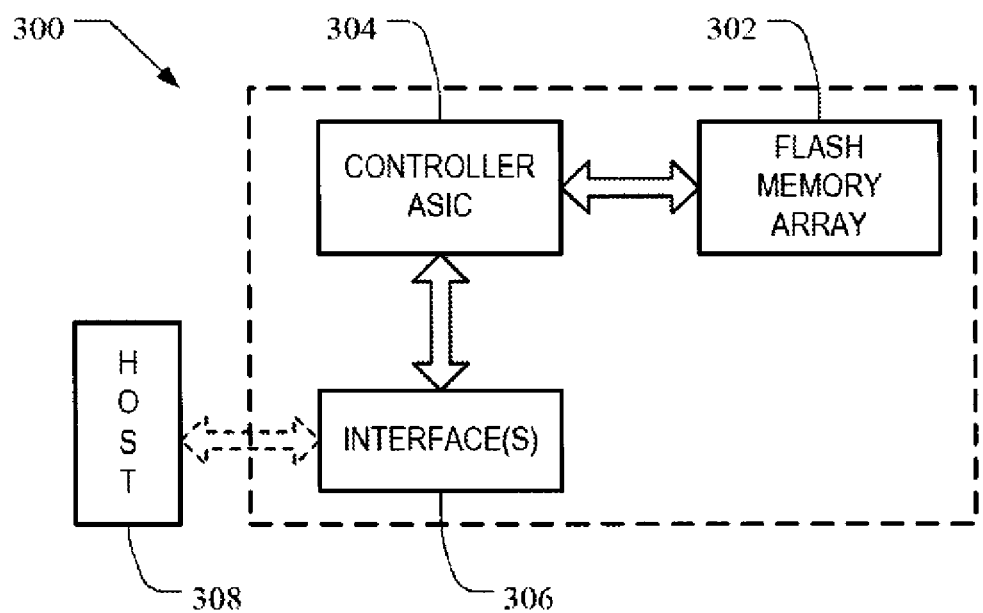
Figure 4:
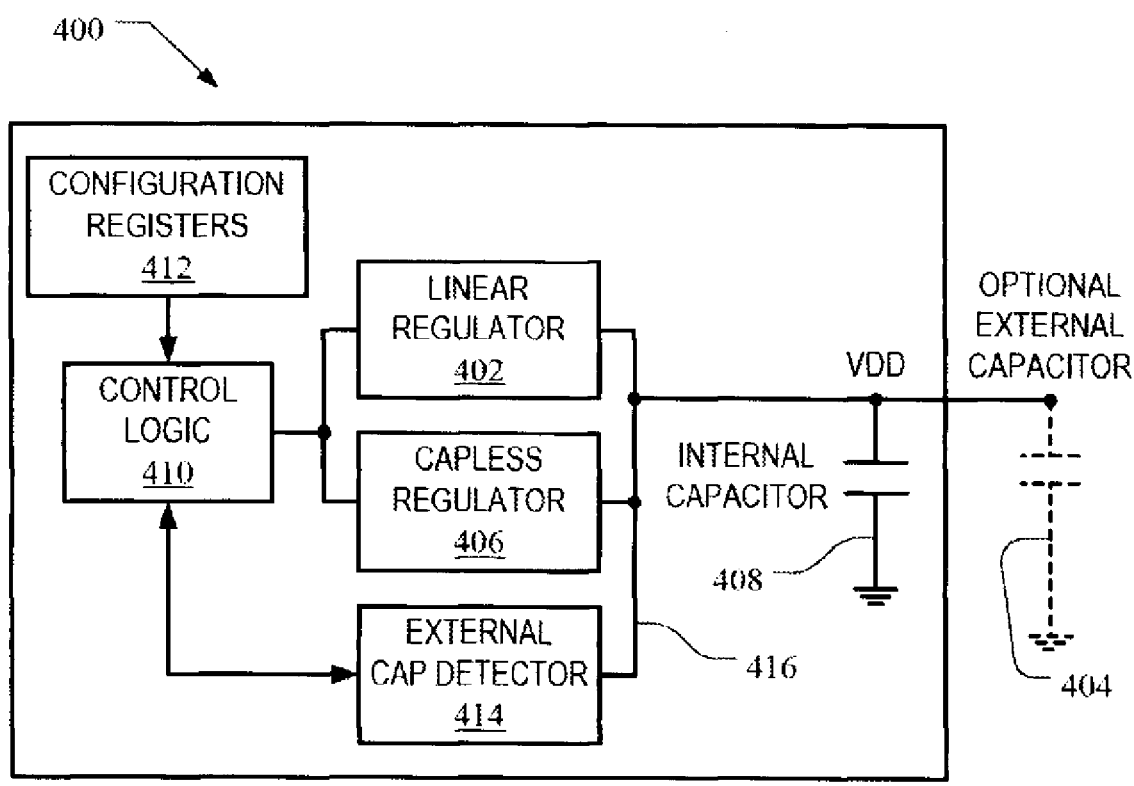
Figure 5:
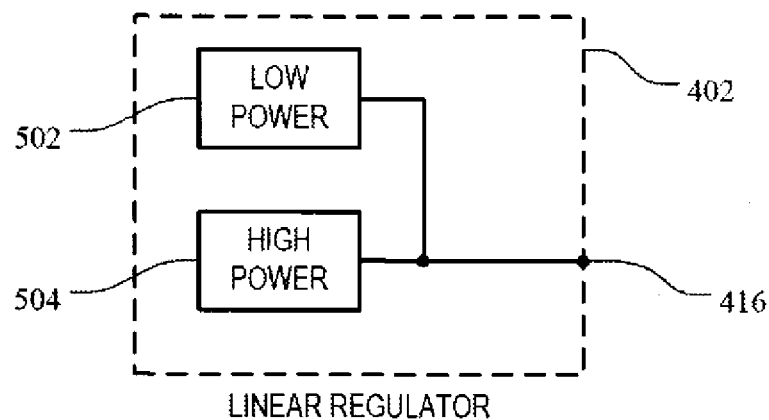
Figure 6:
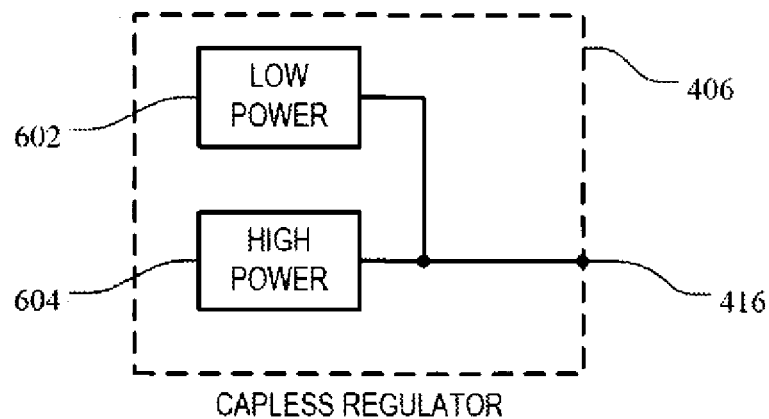
Figure 7:
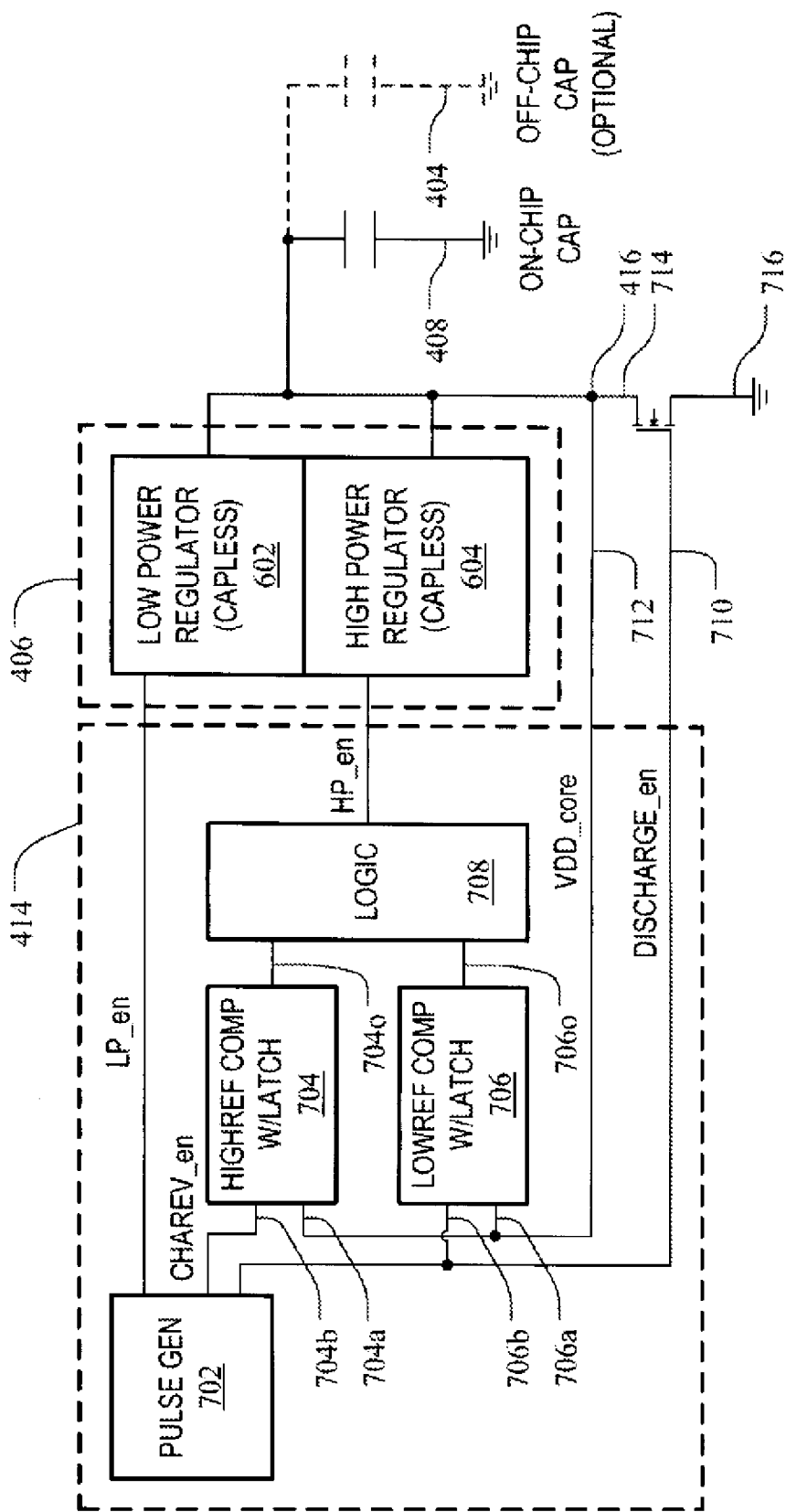
Figures 1, 8:
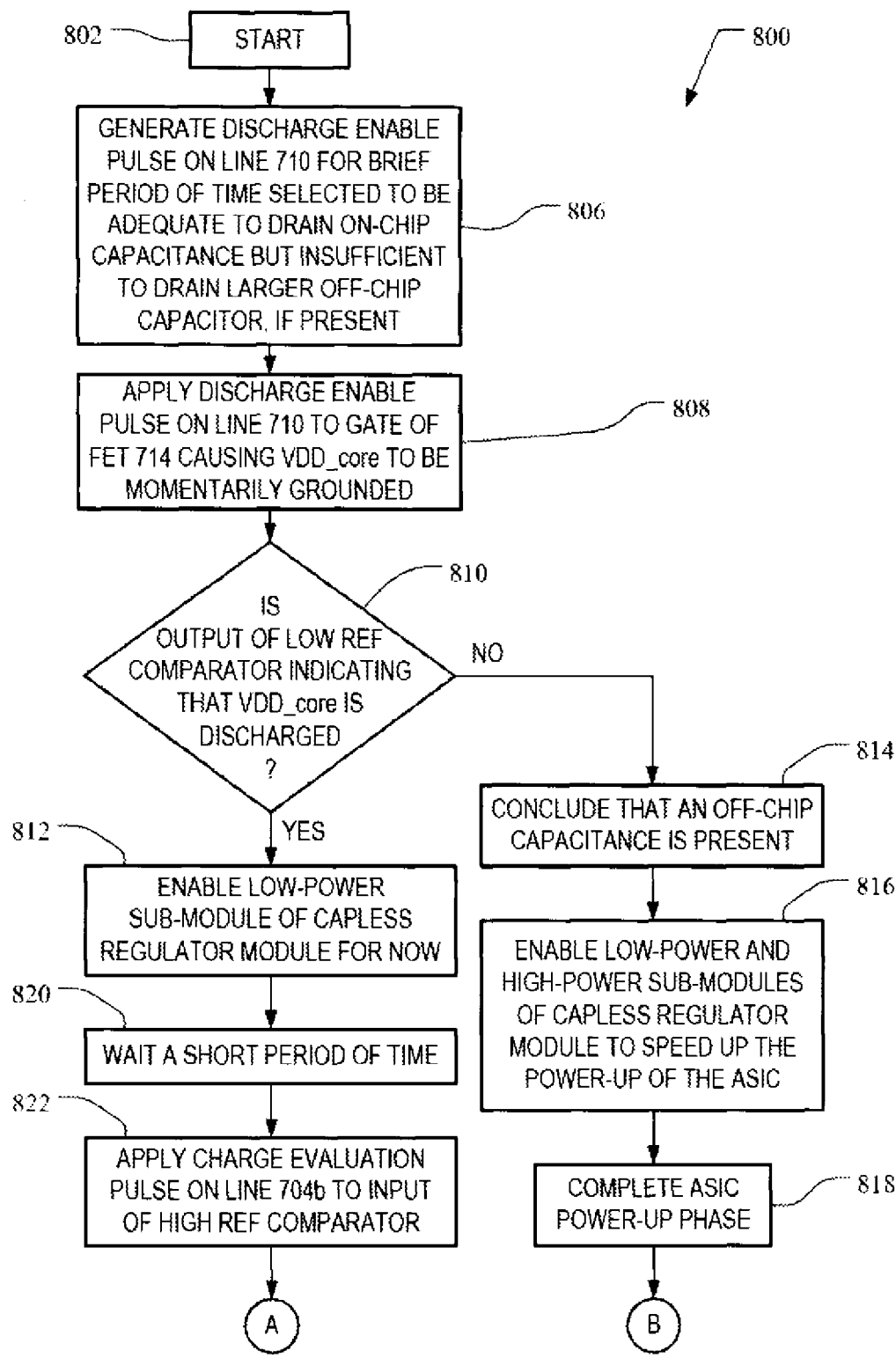
Figures 2, 8:
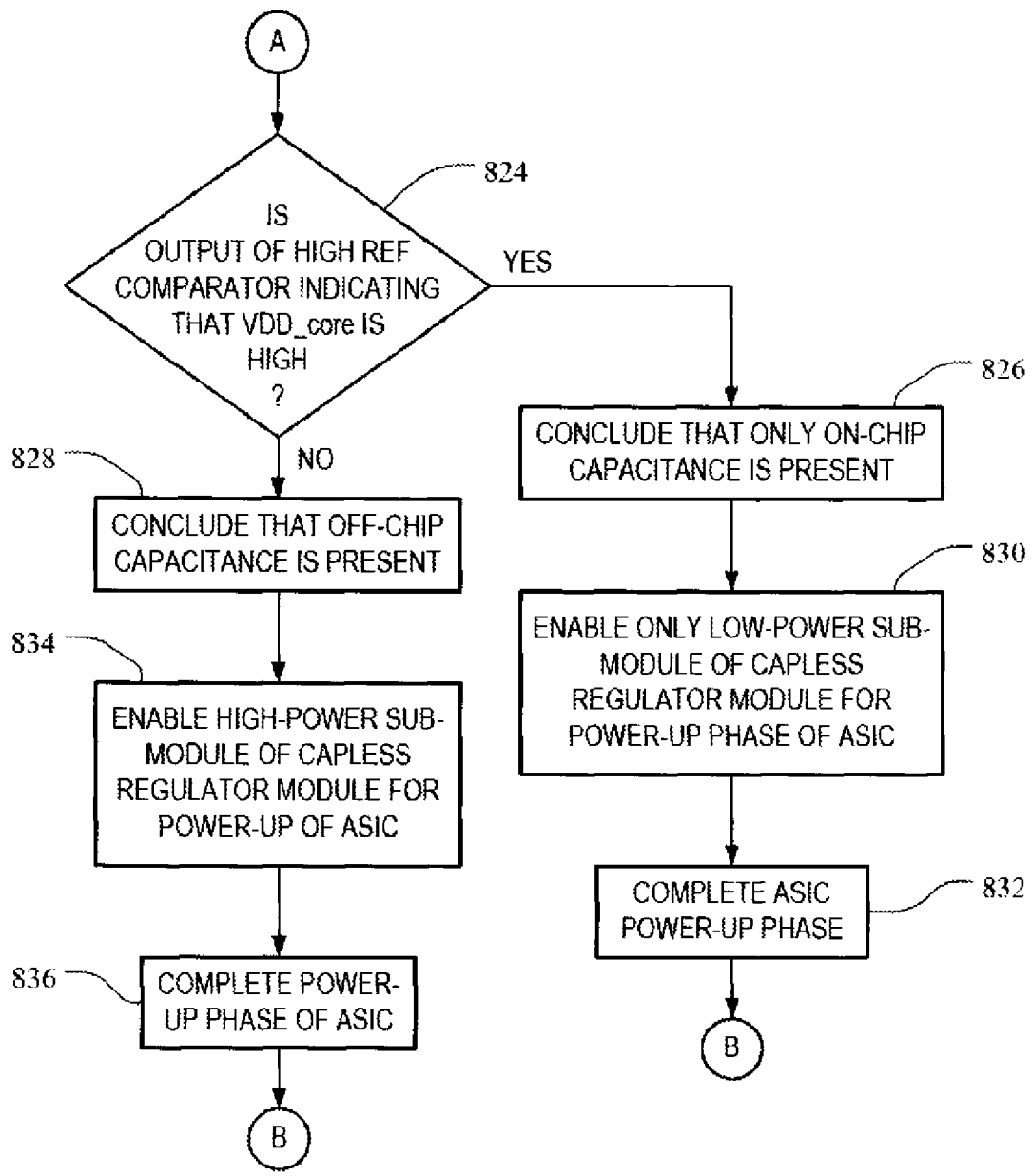
Figures 3, 8:
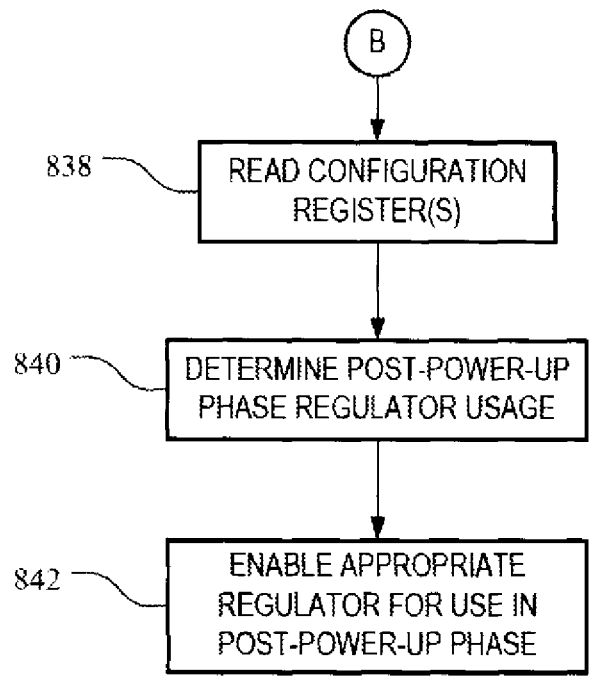

In the example memory device context, controller 304 is typically powered by an external device, such as the host device 308 and includes power supply circuitry such as that illustrated in FIGS. 1 and 2 in order to condition electrical power provided for use by its circuitry.

Figure 4:
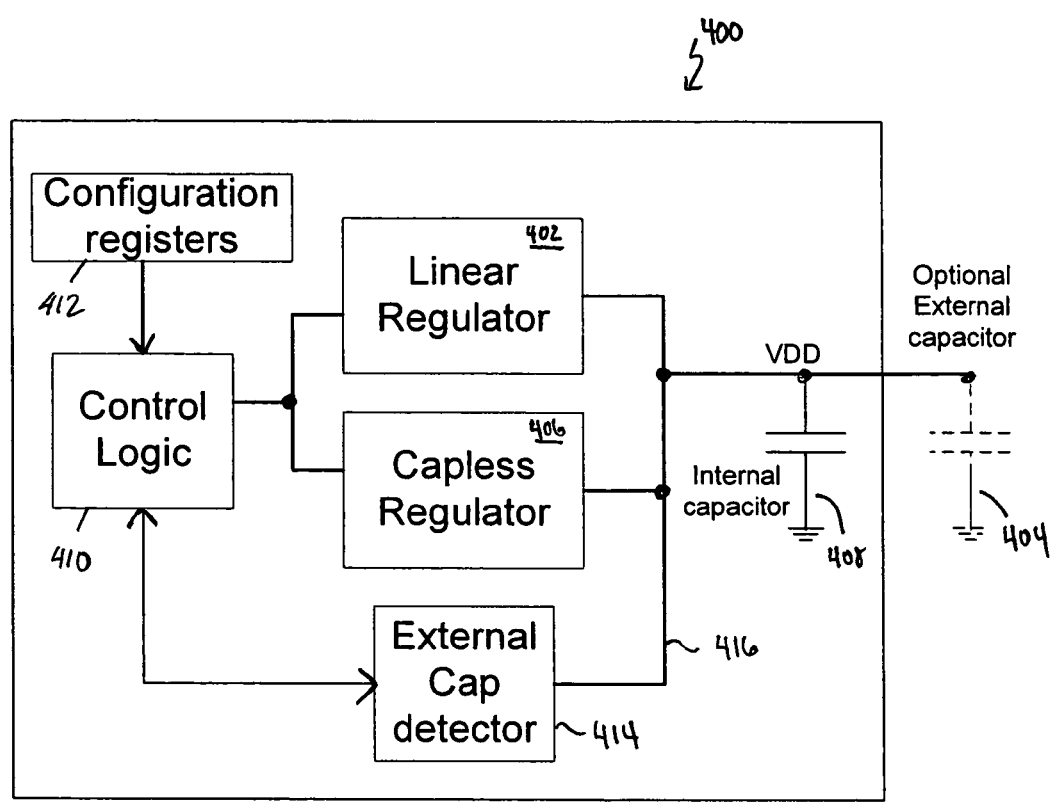
FIG. 4 is a schematic block diagram of a power supply portion of a third electronic product selectively powerable by a linear regulator module or a capless regulator module and including an external capacitor detector in accordance with one embodiment.

Turning now to FIG. 4, in accordance with one embodiment, a power circuit 400 includes a linear regulator module 402 (which requires coupling to an external-to-the-ASIC capacitor 404 of relatively high capacitance (on the order of one or more microfarads of capacitance)) as well as a "capless" regulator module 406 (which requires no external capacitor and makes do with a very small discrete decoupling capacitor or with the capacitance inherent in the circuitry of the ASIC 408 (on the order of 0.5 nF to a few nF (nanofarads) of capacitance)) both provided on the ASIC. An ASIC built in accordance with this concept may now be used in more than one application and the costs of development of the ASIC may be spread over a much larger potential market. For example, one ASIC may be used to build memory devices compatible with the micro SD standard as well as memory devices compatible with the Memory Stick standard even though such disparate devices would be expected to use different capacitor arrangements. External capacitors may be employed, or not, as required by the electrical design.

So called "capless" regulators are well known in the art. For example, an integrated linear regulator using only a 0.6 nF decoupling capacitor is described in detail in Hazucha et al., *Area-Efficient Linear Regulator With Ultra-Fast Load Regulation,* IEEE Journal of Solid State Circuits, Vol. 40, No. 4 (April, 2005). Such circuits use extremely small capacitance—either provided by discrete but low-valued capacitors integrated onto the semiconductor die along with the rest of the regulator circuitry or the inherent parasitic capacitance of that circuitry. Typically these capacitances range from roughly 0.5 nF to a few nF.

Figure 5:
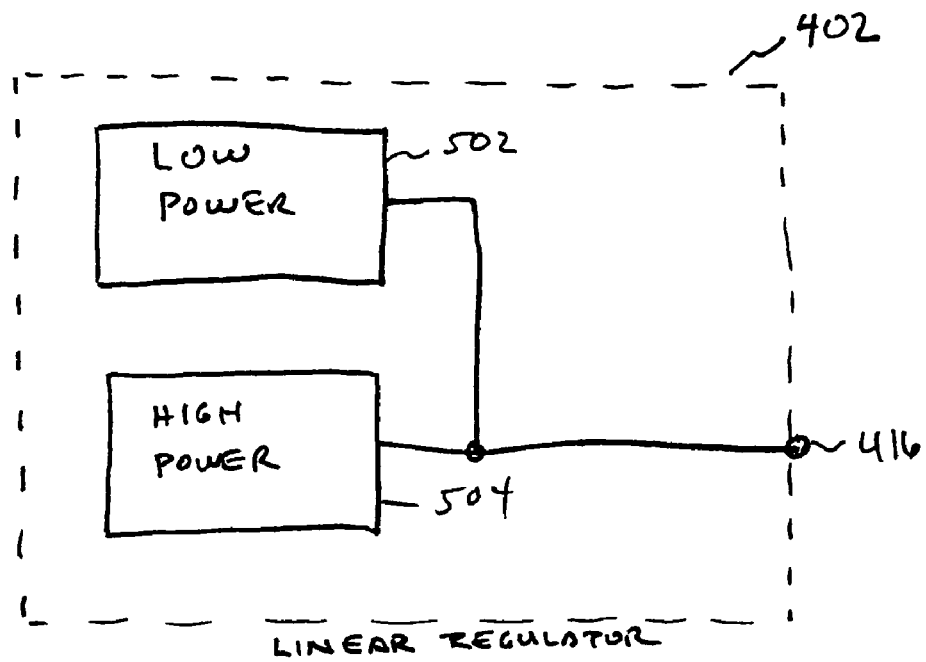
FIG. 5 is a schematic block diagram of a linear regulator module in accordance with one embodiment.

Linear regulator module 402 is depicted in some more detail in FIG. 5 where it is illustrated to comprise a low-power sub-module 502 (for providing relatively low power in a standby mode, for example) and a high-power sub-module 504 (for providing relatively high power in a regular operating mode). In one example embodiment the low-power sub-module may provide electrical current up to about 5 mA and the high-power module may provide electrical current up to about 100 mA. One is typically selected for use at a time, or the low-power sub-module may be left on at all times and supplemented by the high-power sub-module when required.

Figure 6:
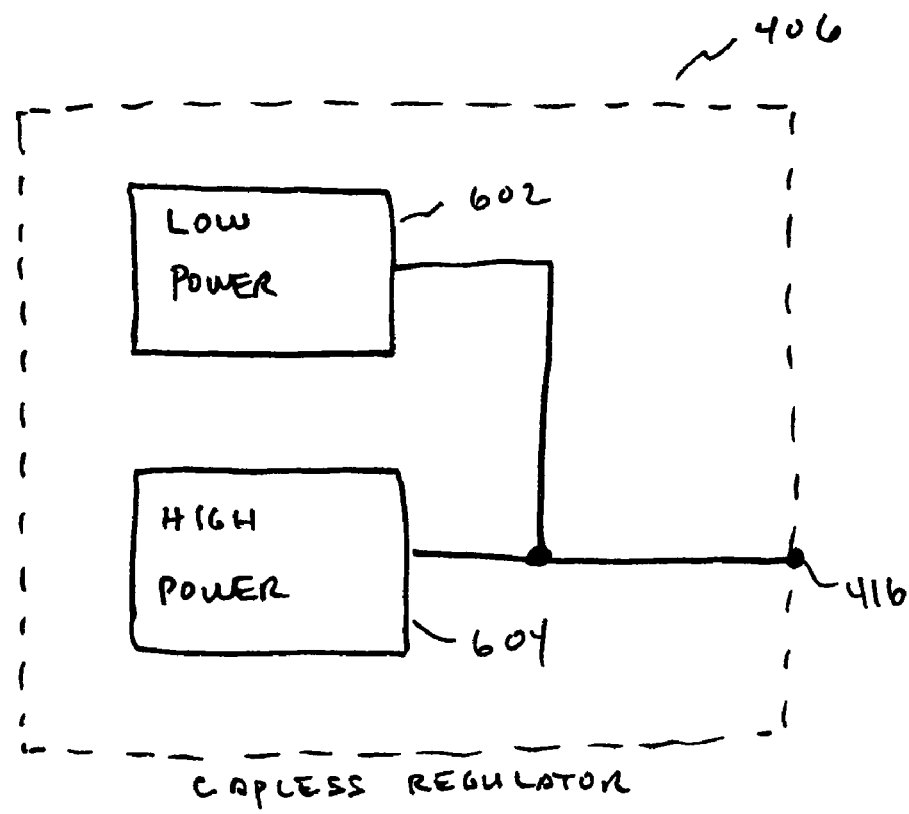
FIG. 6 is a schematic block diagram of a capless regulator module in accordance with one embodiment.

Capless regulator module 406 is depicted in some more detail in FIG. 6 where it is illustrated to comprise a low-power sub-module 602 (for providing relatively low power in a standby mode, for example) and a high-power sub-module 604 (for providing relatively high power in a regular operating mode). In one example embodiment the low-power sub-module may provide electrical current up to about 5 mA and the high-power sub-module may provide electrical current up to about 100 mA. One is typically selected for use at a time, or the low-power sub-module may be left on at all times and supplemented by the high-power sub-module when required.

If a capless regulator is used in the product, only internal capacitance is present which is on the order of nanofarads. On the other hand, a much larger capacitance on the order of microfarad or so will be present if the linear regulator is configured for use in the product (with the presence of an external capacitance). The range of potential capacitance values is then on the order of 200× or more. If not controlled, this means that the slew rate of the core voltage will vary by the same wide margin. It is possible that in one worst case the voltage could ramp up on the order of nanoseconds, triggering an ESD (electrostatic discharge) protection (claimp) device which could effectively prevent the controller from powering up. Alternatively, in another worst case if the ramp rate is too slow, specified minimum thresholds for product wake-up might be violated leading the host to conclude that the device is inoperative. This is solved in one embodiment by using by default low-power sub-module 602 of the capless regulator module 402 (which avoids an ESD claimp) unless overridden by one of the techniques discussed below.

Turning back to FIG. 4, power circuit 400 includes control logic 410 executable by the ASIC 304 which is configured to access configuration registers 412. Configuration registers 412 (which may be implemented in the controller or in flash memory array 302) may store information which may be used to determine a post-power-up initial selection of one of the two regulator modules. In one embodiment the configuration registers may be configured to disable operation of the external capacitor detector 414 (described in more detail below) for more flexibility.

Since the low-power sub-module of the capless regulator module is stable without the presence of an external capacitor by default (it is designed that way), its low-power sub-module is automatically initially selected to provide power to the ASIC core during power-up. If external capacitance is then detected during power-up, then it is also safe to use the high-power sub-module of the capless regulator module to speed up the VDD_core ramp rate because the external capacitance will prevent the regulator from ramping too quickly.

To accomplish this, the external capacitor detector 414 is coupled to node 416 (VDD_core) to which is also coupled the internal capacitance 408 (sometimes referred to as parasitic capacitance), and (optionally) an external capacitance 404. Ideally where an external capacitance is present, it will in many cases be desirable to force the circuitry to utilize the linear regulator module 402 rather than the capless regulator module 406. By verifying the presence (or absence) of external capacitor 404, external capacitor detector 414 now makes that possible, thus avoiding in some embodiments the potential for harm due to accidental misconfiguration of ASICs at the factory (e.g., as by accidentally setting the configuration registers to tell the ASIC that an external capacitor is present (or absent) when in fact it is absent (or present)).

Operation of an external capacitor detector 414 in accordance with one embodiment is now discussed in more detail. The external capacitor detector 414 includes a pulse generator 702, a first and a second latching output comparator (704, 706) and associated logic (708) to control the core regulator's ramp rate. The sequence of events following he initiation of power-up are:

1) A 'Discharge_en' (discharge enable) pulse on line 710 is generated briefly (in one embodiment a pulse width of about 20Sec is used) to briefly discharge VDD_core 712 (the core VDD regulated supply). This is done by turning on the gate of FET (field effect transistor) 714 which has the effect of coupling node 416 to ground 716. The intent is to couple VDD_core 712 briefly to ground 716 to see if it will discharge during the brief time.

2) If the 'LowRef' comparator 706 output 706*o* (comparing VDD_core on input 706*a* with Discharge_en on input 706*b*) indicates that the VDD_core 712 level is still high after the brief discharge cycle, it is then assumed that an off-chip capacitor 404 having microfarads of capacitance is present (because the brief discharge cycle would have discharged any charge on a much smaller internal capacitance). As a result, both the high-power and low-power sub-modules of the capless regulator module are enabled for operation (HP_en and LP_en are set to enable) to speed up the VDD ramp rate (this is safe to do because of the detected presence of the capacitor).

3) If, instead, the 'LowRef' comparator 706 output 706*o* indicates that VDD_core is now low after discharge indicating the possible lack of an external capacitor 404 (VDD_core may have started low and an external capacitor thus still may or may not be present), then 'LP_en' is set to enable so as to use the low-power sub-module of the capless regulator module for ramping up the VDD_core 712 power supply level.

4) Next, the 'CharEv_en' (charge evaluation pulse) signal is generated after a few microseconds (μSecs) to sense the VDD_core voltage level once again. If the 'HighRef' comparator output 704*o* now indicates that the VDD_core level is high, that indicates that only on-chip capacitance is present (i.e., there is no external capacitance) because of the quick ramp from low to high and thus only the low-power capless regulator module will be enabled during power-up. Otherwise the high-power sub-module of the capless regulator modulator will be enabled as well.

Once power-up of the ASIC core is completed (i.e., the VDD_core voltage is established), configuration information stored in the configuration registers at manufacture (accessible by the control logic of the ASIC—either on board the ASIC, on the flash memory array, or in another location) is read and based thereon, the ASIC control logic (which may be implemented by firmware executed by the control logic in the ASIC) selects the desired regulator for post power-up operation (either the linear regulator module or the capless regulator module). The desired regulator is then turned on (if not already on) and the other regulator is turned off (if it was on). Alternatively, the ASIC firmware may select one (or potentially both) of the two regulator modules for use after power-up based upon the earlier determination made during power-up of the presence or absence of an external capacitor described above. In yet another embodiment, conditions sensed during operation (e.g., current use, battery or input power state, and the like) may be used to select one of the two regulator modules "on the fly."

FIGS. 8-1, 8-2 and 8-3 together constitute a process flow diagram illustrating a method 800 in accordance with one embodiment. The method starts at block 802.

Figure 7:
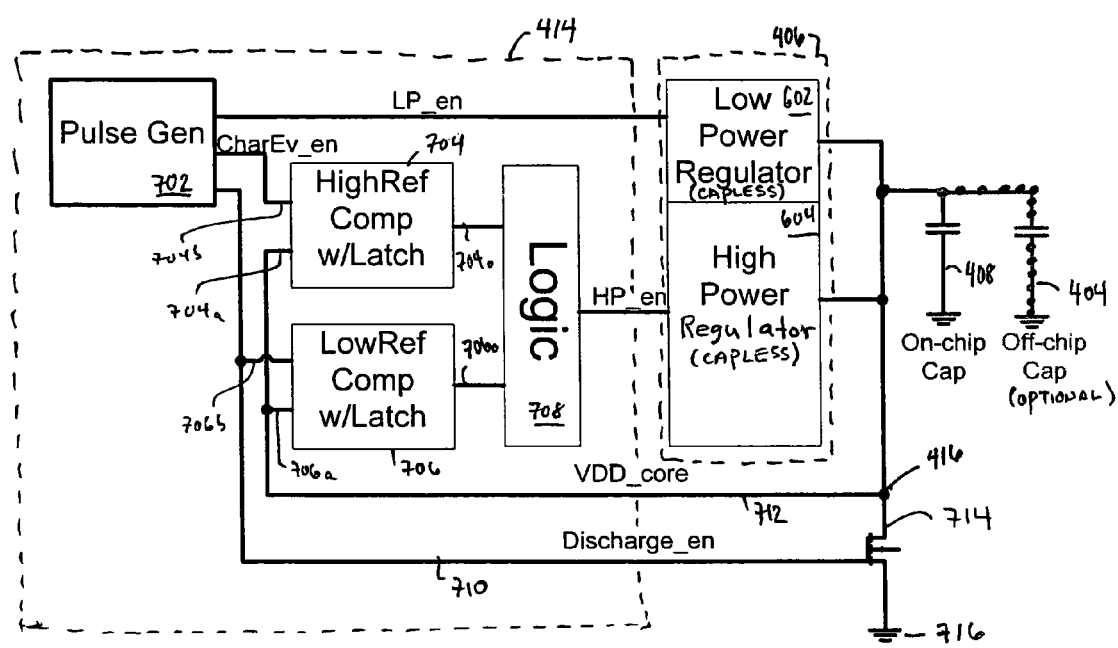
FIG. 7 is a schematic block diagram of control logic controlling a capless regulator module in accordance with one embodiment.

At block 806 a discharge enable pulse is generated on line 710 (FIG. 7) for a brief period of time selected to be adequate to discharge any on-chip capacitance but inadequate to discharge a larger optional off-chip capacitance (if present).

At block 808 the discharge enable pulse is applied over line 710 to the gate of FET 714 causing VDD_core momentarily to short to ground 716.

At decision block 810 the output 706*o* of the LowRef latching comparator 706 (determined by comparing inputs 706*a* (VDD_core) and 706*b* (discharge enable) is checked to see if VDD_core is discharged. If it is, control transfers to block 812; if not, control transfers to block 814.

At block 814 the conclusion is reached that an off-chip (large) capacitance 404 is present.

At block 816 the low-power 602 and high-power 604 sub-modules of capless regulator module 406 are enabled in order to provide more electrical current and thereby speed up the power-up of the ASIC.

At block 818 the power-up phase of the ASIC is completed and control transfers to Node B.

At block 812 it is still unclear as to whether or not an external capacitance 404 is present. Only the low-power sub-module 602 of the capless regulator module 406 will be used for now.

At block 820 the process waits a short period of time.

At block 822 a charge evaluation pulse is applied to the line 704*b* input to the HighRef Latching comparator 704 comparing it with VDD_core on input line 704*a*. Control transfers to Node A.

At decision block 824 the output 704*o* of HighRef comparator 704 is checked to see if it indicates that VDD_core is high. If it is (and that can only happen if a large capacitance is NOT present) then control transfers to block 826. Otherwise control transfers to block 828.

At block 826 it is concluded that only on-chip capacitance 408 is present and no off-chip (large) optional capacitor 404 is present.

At block 830 only the low-power sub-module of the capless regulator module is enabled for the power-up phase of the ASIC by logic block 708.

At block 832 the ASIC power-up phase is completed and control transfers to Node B.

At block 828 it is concluded that an off-chip capacitance 404 is present.

At block 834 logic block 708 enables the low-power 602 and high-power 604 submodules of the capless regulator module 406 for use in powering up the ASIC. This provides more current than the low-power sub-module alone and thus allows a faster power-up.

At block 836 the ASIC power-up phase is completed and control transfers to Node B.

At block 838 (reached from Node B) after power-up the control logic of the ASIC reads the configuration register(s).

At block 840 the post-power-up phase regulator usage is determined based upon the information read from the configuration register(s). For example, this could be, in effect, "Use Capless Regulator Module" or "Use Linear Regulator Module" and it could further specify whether to initially use the low-power or high-power sub-module of the respective regulator module, if desired.

At block 842, in response to the determination made in block 840, the appropriate regulator module (and possibly sub-module) for use in the post-power-up phase is enabled.

In another embodiment it is also possible to modify blocks 838, 840 and 842 so that instead of allowing configuration registers to select the post-power-up regulator module for use, the prior determination as to the presence or absence of an off-chip capacitance 404 would yield that decision, thus requiring no pre-configuration of the device in this regard.

Accordingly, a single ASIC device may now be fabricated and used in a wider array of products increasing its utility and decreasing overall development and per-part costs.

While embodiments and applications have been shown and described, it would be apparent to those skilled in the art having the benefit of this disclosure that many more modifications than mentioned above are possible without departing from the inventive concepts disclosed herein. For example, additional regulator modules and/or sub-modules may be provided and selected among. The invention, therefore, is not to be restricted except in the spirit of the appended claims.

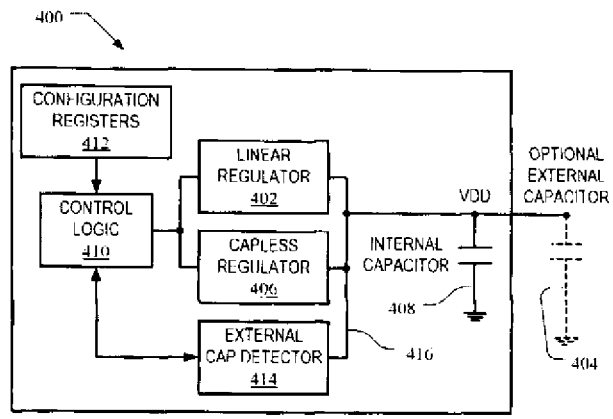

What is claimed is:

1. A method for operating an electronic apparatus, the apparatus including an ASIC device, a linear regulator module configured to be optionally coupled to an external-to-the-ASIC device capacitor via a node and a capless regulator module coupled to an internal capacitance of the electronic product via the node, the capless regulator module including a low-power sub-module and a high-power sub-module, the high-power sub-module configured to provide a greater amount of electrical current than the low-power sub-module, the method comprising:
   applying power initially to the ASIC device via the node with the low-power sub-module of the capless regulator module to initiate ASIC device power-up; and
   detecting whether or not an external capacitance is coupled to the node.

2. The method of claim 1, further comprising:
   subsequently applying power to the ASIC device via the node with the high-power sub-module of the capless regulator module in response to detection of an external-to-the-ASIC device capacitor coupled to the node.

3. The method of claim 2, further comprising:
   completing the power-up of the ASIC device.

4. The method of claim 3, further comprising:
   selecting one of the linear regulator module and the capless regulator module to provide power to the ASIC device after power-up of the ASIC device.

5. The method of claim 4, wherein the selecting is carried out by executing control logic in the ASIC device.

6. The method of claim 4, wherein the selecting is responsive to a stored state of a configuration register accessible by the ASIC device.

7. The method of claim 1, further comprising:
   subsequently applying power to the ASIC device via the node with the low-power sub-module of the capless regulator module in response to detection of an absence of an external-to-the-ASIC device capacitor coupled to the node.

8. The method of claim 7, further comprising:
   completing the power-up of the ASIC device.

9. The method of claim 8, further comprising:
   selecting one of the linear regulator module and the capless regulator module to provide power to the ASIC device after power-up of the ASIC device.

10. The method of claim 9, wherein the selecting is carried out by executing control logic in the ASIC device.

11. The method of claim 9, wherein the selecting is responsive to a stored state of a configuration register accessible by the ASIC device.

12. A method for operating a memory device, the memory device including a memory array, an interface circuit configured to communicate with a host device, a controller coupled to communicate with the memory array and the interface circuit, the controller implemented on an ASIC device, the controller including a linear regulator module configured to be optionally coupled in operation to an external-to-the-ASIC device capacitor via a node and a capless regulator module coupled to an internal capacitance of the ASIC device via the node, the capless regulator module including a low-power sub-module and a high-power sub-module, the high-power sub-module configured to provide a greater amount of electrical current than the low-power sub-module, the method comprising:
   applying power initially to the ASIC device via the node with the low-power sub-module of the capless regulator module to initiate ASIC device power-up; and
   detecting whether or not an external capacitance is coupled to the node.

13. The method of claim 12, further comprising:
   subsequently applying power to the ASIC device via the node with the high-power sub-module of the capless regulator module in response to detection of the external capacitance coupled to the node.

14. The method of claim 13, further comprising:
   completing the power-up of the ASIC device.

15. The method of claim 14, further comprising:
   selecting one of the linear regulator module and the capless regulator module to provide power to the ASIC device after power-up.

16. The method of claim 15, wherein the selecting is carried out by executing control logic in the ASIC device.

17. The memory device of claim 13, wherein the second level of electrical current is greater than the first level of electrical current.

18. The method of claim 15, wherein the selecting is responsive to a stored state of a configuration register accessible by the ASIC device.

19. The method of claim 12, further comprising:
   subsequently applying power to the ASIC device via the node with the low-power sub-module of the capless regulator module in response to detection of the absence of an external capacitance coupled to the node.

20. The method of claim 19, further comprising:
   completing the power-up of the ASIC device.

21. The method of claim 20, further comprising:
selecting one of the linear regulator module and the capless regulator module to provide power to the ASIC device after power-up.

22. The method of claim 21, wherein the selecting is carried out by executing control logic in the ASIC device.

23. The method of claim 21, wherein the selecting is responsive to a stored state of a configuration register accessible by the ASIC device.

24. An electronic apparatus, comprising:
an application specific semiconductor chip (ASIC) device;
a linear regulator module configured to be optionally coupled in operation to an external-to-the-ASIC device capacitor via a node;
a capless regulator module coupled to an internal capacitance of the electronic product via the node, the capless regulator module including a low-power sub-module and a high-power sub-module, the high-power sub-module configured to provide a larger amount of electrical current than the low-power sub-module; and
control logic executable by the ASIC device, the control logic configured to detect the presence of the optional external capacitance and responsive thereto configured to select for use during a power-up phase of the ASIC at least the high-power sub-module of the capless regulator module if the optional external-to-the-ASIC device capacitor is detected.

25. The apparatus of claim 24, wherein the control logic is configured to select for use during the power-up phase of the ASIC device at least the low-power sub-module of the capless regulator module.

26. The apparatus of claim 24, wherein the linear regulator module includes at least a first and a second linear regulator sub-module, the first linear regulator sub-module configured to provide up to a first level of electrical current and the second linear regulator sub-module configured to provide up to a second level of electrical current.

27. The apparatus of claim 26, wherein the second level of electrical current is greater than the first level of electrical current.

28. The apparatus of claim 24, wherein the apparatus is initially configured to use the capless regulator module prior for providing power to power-up the ASIC device during at least a portion of the power-up phase of the ASIC device.

29. The apparatus of claim 24, wherein the apparatus is initially configured to use the low-power sub-module of the capless regulator module for providing power to power-up the ASIC device during at least a portion of the power-up phase of the ASIC device.

30. The apparatus of claim 24, wherein the control logic is configured to detect the presence of the optional external-to-the-ASIC device capacitor at least in part by discharging the node.

31. The apparatus of claim 24, wherein the control logic is configured to detect the presence of the optional external-to-the-ASIC device capacitor at least in part by charging the node.

32. The apparatus of claim 24, wherein the control logic is configured to detect the presence of the optional external-to-the-ASIC device capacitor at least in part by both discharging and subsequently charging the node.

33. The apparatus of claim 24, further comprising:
a configuration register configured to be read by the ASIC device, the configuration register configured to be programmed with a selection of one of the capless regulator module and the linear regulator module for use by the ASIC device after the power-up phase is completed,
wherein the ASIC device is configured to respond to the selection by selecting the programmed one of the capless regulator module and the linear regulator module for use after the power-up phase is completed.

34. A memory device, comprising:
a memory array;
an interface circuit configured to communicate with a host device;
a controller coupled to communicate with the memory array and with the interface circuit, the controller implemented on an ASIC device, the controller including:
a linear regulator module configured to be optionally coupled in operation to an external-to-the-ASIC device capacitor via a node;
a capless regulator module coupled to an internal capacitance of the electronic product via the node, the capless regulator module including a low-power sub-module and a high-power sub-module, the high-power sub-module configured to provide a larger amount of electrical current than the low-power sub-module; and
control logic executable by the ASIC device, the control logic configured to detect the presence of the optional external-to-the-ASIC device capacitor and responsive thereto configured to select for use during a power-up phase of the ASIC device at least the high-power sub-module of the capless regulator module if the optional external-to-the-ASIC capacitor is detected.

35. The memory device of claim 34, wherein the control logic is configured to select for use during the power-up phase of the ASIC device at least the low-power sub-module of the capless regulator module.

36. The memory device of claim 34, wherein the linear regulator module includes at least a first and a second linear regulator sub-module, the first linear regulator sub-module configured to provide up to a first level of electrical current and the second linear regulator sub-module configured to provide up to a second level of electrical current.

37. The memory device of claim 34, wherein the memory device is initially configured to use the capless regulator module prior for providing power to power-up the ASIC device during at least a portion of the power-up phase of the ASIC device.

38. The memory device of claim 34, wherein the memory device is initially configured to use the low-power sub-module of the capless regulator module for providing power to power-up the ASIC device during at least a portion of the power-up phase of the ASIC device.

39. The memory device of claim 34, wherein the control logic is configured to detect the presence of the optional external-to-the-ASIC device capacitor at least in part by discharging the node.

40. The memory device of claim 34, wherein the control logic is configured to detect the presence of the optional external-to-the-ASIC device capacitor at least in part by charging the node.

41. The memory device of claim 34, wherein the control logic is configured to detect the presence of the optional external-to-the-ASIC device capacitor at least in part by both discharging and subsequently charging the node.

42. The memory device of claim 34, further comprising:
a configuration register configured to be read by the ASIC device, the configuration register configured to be programmed with a selection of one of the capless regulator module and the linear regulator module for use by the ASIC device after the power-up phase is completed, wherein the ASIC device is configured to respond to the selection by selecting the programmed one of the capless regulator module and the linear regulator module for use after the power-up phase is completed.

* * * * *

UNITED STATES PATENT AND TRADEMARK OFFICE
CERTIFICATE OF CORRECTION

PATENT NO.         : 7,859,134 B2                                      Page 1 of 10
APPLICATION NO.    : 12/005056
DATED              : December 28, 2010
INVENTOR(S)        : Steve X. Chi et al.

It is certified that error appears in the above-identified patent and that said Letters Patent is hereby corrected as shown below:

The title page should be deleted to appear as per attached title page.

The sheets of drawings consisting of figures 1-8 should be deleted to appear as per attached figures 1-8.

Signed and Sealed this
Twentieth Day of September, 2011

David J. Kappos
*Director of the United States Patent and Trademark Office*

(12) United States Patent
Chi et al.

(10) Patent No.: US 7,859,134 B2
(45) Date of Patent: Dec. 28, 2010

(54) SELF-CONFIGURABLE MULTI-REGULATOR ASIC CORE POWER DELIVERY

(75) Inventors: Steve X. Chi, Cupertino, CA (US); Yongliang Wang, Saratoga, CA (US); Ekram Hossain Bhuiyan, San Jose, CA (US); Daniel P. Nguyen, Campbell, CA (US); Vincent Anthony Condito, San Jose, CA (US); Po-Shen Lai, San Jose, CA (US)

(73) Assignee: SanDisk Corporation, Milpitas, CA (US)

( * ) Notice: Subject to any disclaimer, the term of this patent is extended or adjusted under 35 U.S.C. 154(b) by 423 days.

(21) Appl. No.: 12/005,056

(22) Filed: Dec. 21, 2007

(65) Prior Publication Data
US 2009/0164807 A1    Jun. 25, 2009

(51) Int. Cl.
  H02J 1/00    (2006.01)
  H02J 3/00    (2006.01)
(52) U.S. Cl. .............................................. 307/80
(58) Field of Classification Search ............. 307/80, 307/82, 85
See application file for complete search history.

(56) References Cited

U.S. PATENT DOCUMENTS

| | | |
|---|---|---|
| 6,097,241 A | 8/2000 | Bertin et al. |
| 6,654,263 B2 | 11/2003 | Kurotsu |
| 6,654,264 B2 | 11/2003 | Rose |
| 6,710,621 B2 | 3/2004 | Devlin et al. |
| 6,950,896 B2 | 9/2005 | Scordalakes et al. |
| 7,058,373 B2 | 6/2006 | Grigore |
| 2006/0270366 A1 | 11/2006 | Rozenblit et al. |

(Continued)

FOREIGN PATENT DOCUMENTS

KR    10-2007-0029693    3/2007

(Continued)

OTHER PUBLICATIONS

Balan, V., "A Low-Voltage Regulator Circuit With Self-Bias to Improve Accuracy", *2003 IEEE Solid-State Circuit Journal*, vol. 38, No. 2, pp. 365-368, Feb. 2003.

(Continued)

*Primary Examiner*—Jared J Fureman
*Assistant Examiner*—Carlos Amaya
(74) *Attorney, Agent, or Firm*—Brinks Hofer Gilson & Lione

(57) ABSTRACT

A method for operating an electronic product having an application specific semiconductor circuit (ASIC) including in its circuitry both a linear regulator module for use with an optional external capacitance and a capless regulator module coupled to internal capacitance of the product selects a low-power sub-module or high-power sub-module of the capless regulator module for use in a power-up phase of the ASIC. Control logic of the ASIC determines if an external capacitance is present. If so, then the high-power capless sub-module is used during a power-up phase of the ASIC; if not only the low-power capless sub-module is used during the power-up phase of the ASIC. After power-up of the ASIC, the control logic may select the linear regulator module for certain times of operation and the capless regulator module for other times of operation or it may select one or the other for all times of post-power-up operation.

42 Claims, 8 Drawing Sheets